US008632325B2

(12) United States Patent
Voth et al.

(10) Patent No.: US 8,632,325 B2
(45) Date of Patent: Jan. 21, 2014

(54) APPARATUS FOR SHAPING PLASTICS MATERIAL PRE-FORMS WITH A STERILE ROOM

(75) Inventors: Klaus Voth, Obertraubling (DE); Oliver Martini, Konolfingen (CH); Ulrich Lappe, Regensburg (DE); Juergen Soellner, Beratzhausen (DE); Frank Winzinger, Regensburg (DE); Josef Hausladen, Woerth/Donau (DE)

(73) Assignee: Krones AG, Neutraubling (DE)

( * ) Notice: Subject to any disclaimer, the term of this patent is extended or adjusted under 35 U.S.C. 154(b) by 164 days.

(21) Appl. No.: 13/110,560

(22) Filed: May 18, 2011

(65) Prior Publication Data
US 2012/0070522 A1    Mar. 22, 2012

(30) Foreign Application Priority Data
May 20, 2010   (DE) .......................... 10 2010 022 128

(51) Int. Cl.
*B29C 49/12*  (2006.01)
*B29C 49/42*  (2006.01)
*B29C 49/56*  (2006.01)

(52) U.S. Cl.
USPC ................. 425/3; 425/73; 425/210; 425/522; 425/526; 425/529; 425/541

(58) Field of Classification Search
USPC ........ 425/3, 73, 210, 526, 529, 534, 541, 522
See application file for complete search history.

(56) References Cited

U.S. PATENT DOCUMENTS

| | | | | |
|---|---|---|---|---|
| 3,343,210 A * | 9/1967 | Guignard | ....................... | 425/525 |
| 4,208,852 A * | 6/1980 | Pioch | .............................. | 53/167 |
| 4,729,732 A * | 3/1988 | Schad et al. | ................... | 425/526 |
| 5,671,591 A * | 9/1997 | Fleenor | ............................ | 53/452 |
| 6,562,281 B1 * | 5/2003 | Marchau et al. | ............. | 264/532 |
| 6,607,375 B1 * | 8/2003 | Takada et al. | ................ | 425/526 |
| 8,167,601 B2 * | 5/2012 | Matsushita et al. | ............ | 425/73 |
| 2003/0017229 A1 * | 1/2003 | Langos et al. | ................ | 425/541 |
| 2010/0272844 A1 * | 10/2010 | Dordoni | ........................ | 425/210 |
| 2011/0037187 A1 * | 2/2011 | Winzinger et al. | ............. | 264/39 |
| 2011/0133369 A1 * | 6/2011 | Martini et al. | ................. | 264/523 |
| 2011/0287126 A1 * | 11/2011 | Geltinger et al. | ............. | 425/522 |
| 2012/0326360 A1 * | 12/2012 | Geltinger et al. | ............. | 264/570 |

FOREIGN PATENT DOCUMENTS

WO    WO 2011030183 A1 *    3/2011

* cited by examiner

*Primary Examiner* — Robert B Davis
(74) *Attorney, Agent, or Firm* — Novak Druce Connolly Bove + Quigg LLP

(57) ABSTRACT

An apparatus for shaping plastics material pre-forms to form plastics material containers includes a conveying device on which a plurality of blowing stations are arranged. Each of these blowing stations has a blow mold inside which a plastics material pre-form is capable of being shaped to form a plastics material container. The apparatus has a clean room inside which the plastics material pre-forms can be conveyed. The region of the conveying device on which the blowing stations are arranged is situated in the clean room, and at least one further region of the conveying device is arranged outside the clean room.

21 Claims, 7 Drawing Sheets

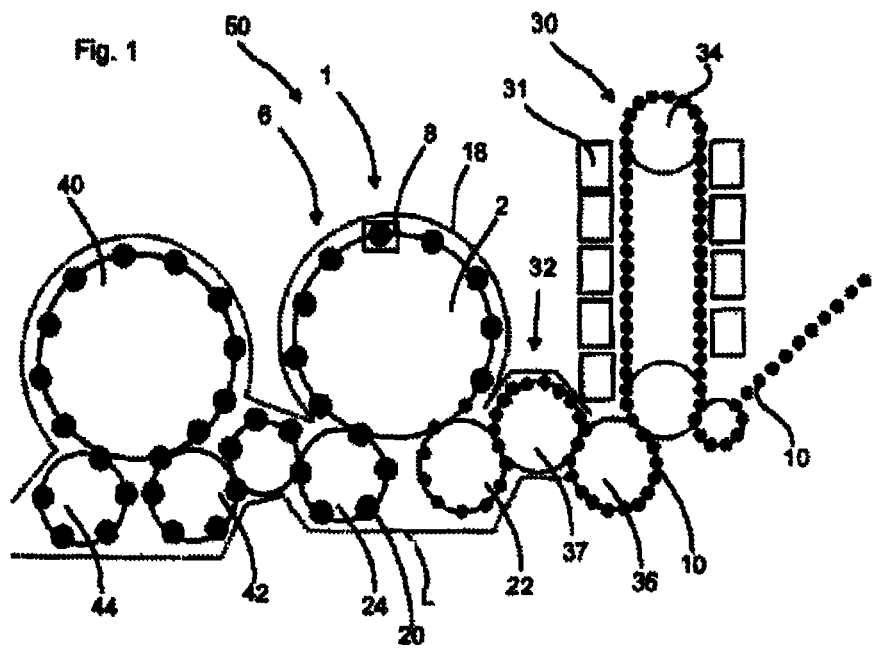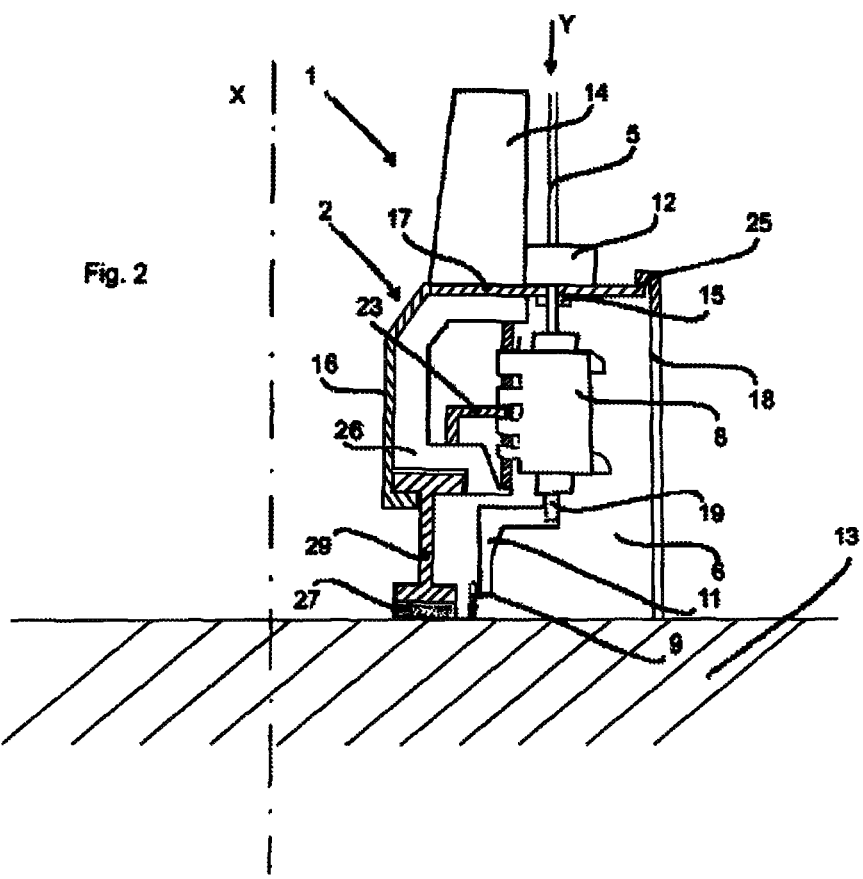

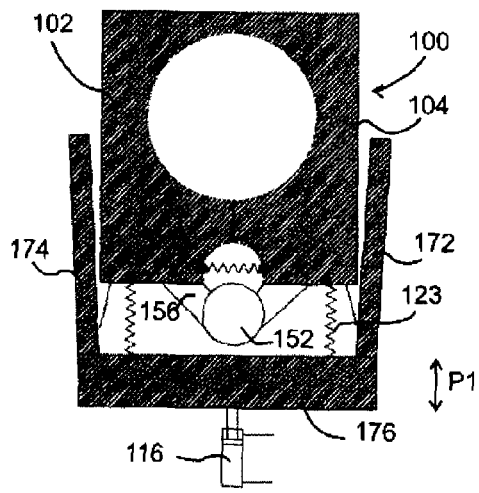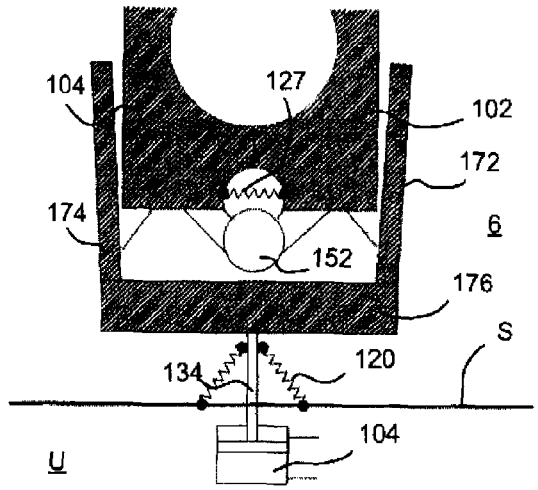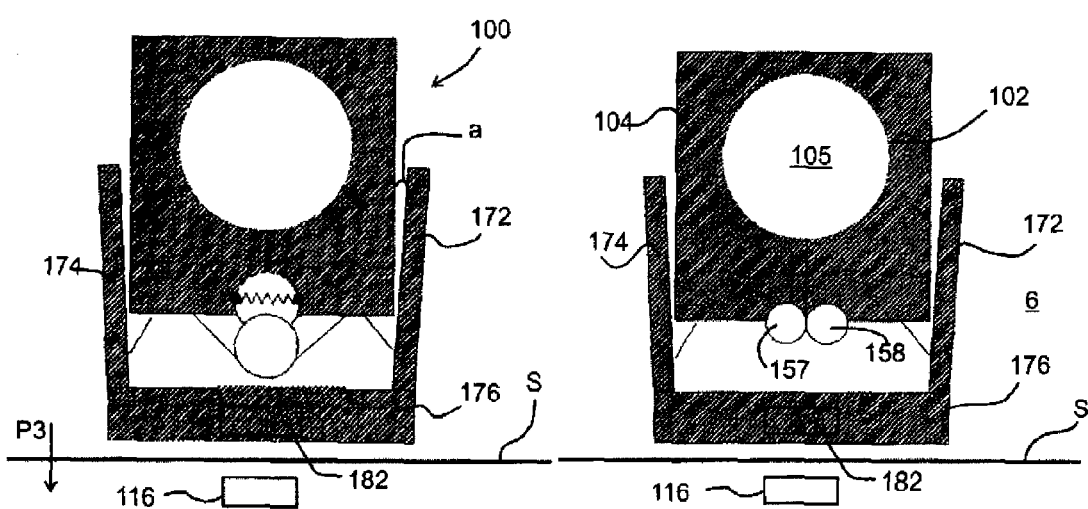

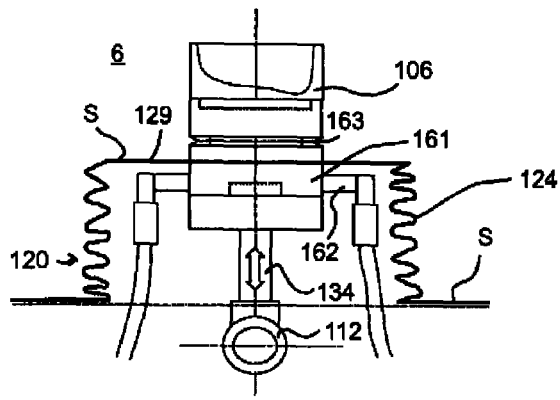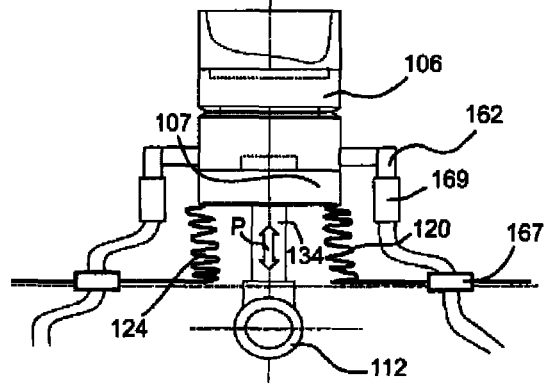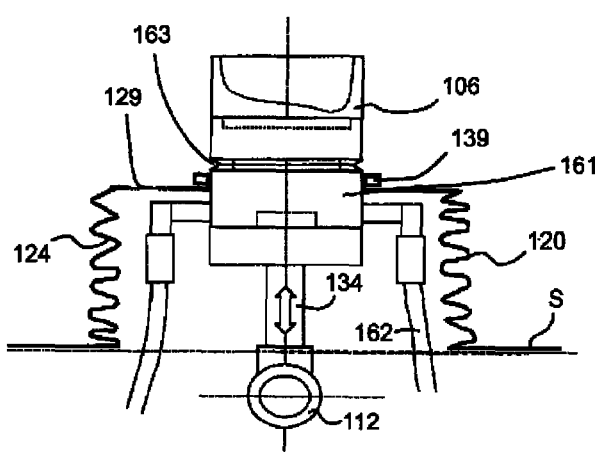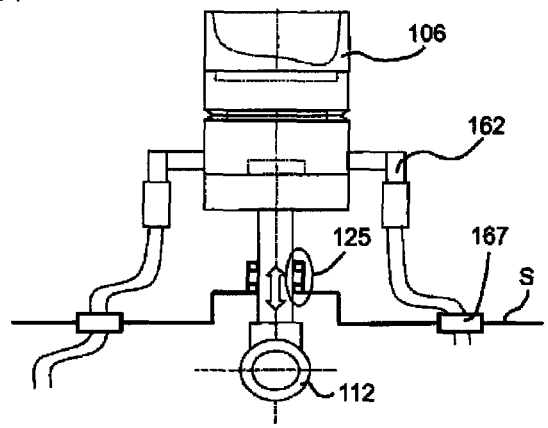

APPARATUS FOR SHAPING PLASTICS MATERIAL PRE-FORMS WITH A STERILE ROOM

CROSS-REFERENCE TO RELATED APPLICATION

This application claims the benefit of priority of German Patent Application No. 10 2010 022 128.7, filed May 20, 2010, pursuant to 35 U.S.C. 119(a)-(d), the disclosure of which is incorporated herein by reference.

TECHNICAL FIELD

The present disclosure relates to an apparatus for shaping plastics material containers.

BACKGROUND

In the field of the beverage production industry it is known to use plastics material containers, these plastics material containers being produced by a shaping procedure, and in particular a blow moulding procedure, from plastics material pre-forms. In this case, blow wheels are usually provided, on which a plurality of blowing stations are arranged, the plastics material pre-forms being expanded inside these blowing stations by being acted upon with compressed air against an inner wall of the corresponding blow mould.

For many beverages it is necessary in this case for them to be filled under aseptic conditions. In this case it is known that a sterilization process for the aseptic filling begins with the sterilization of the already finished bottles in a clean room provided for them. All the processes carried out previously in the prior art, such as the production of pre-forms, the conveying thereof, the heating thereof and the blowing thereof to form a bottle take place in a non-sterile environment. In this case it is necessary for a relatively large area, namely that of the finished plastic bottle, to be sterilized.

The sterilization of containers which are to be filled with a delicate filled product can be carried out for example by the filled product being heated and filled hot and by the inside of the bottle being jointly sterilized with the hot filling product. In addition, it is also possible for the empty container to be sterilized separately before the filling procedure and to be filled under aseptic conditions with the filled product sterilized at a different location. In this case the sterility of the empty container is achieved by chemical disinfecting agents such as peracetic acid (wet) or hydrogen peroxide (dry). To this end the containers are moved into a so-called isolator in which they are acted upon with the disinfecting agent which has to act for a specific time and then has to be removed again with a great outlay. In this case the difficulty of residual amounts arises. The aseptically enclosed filling means is arranged immediately adjacent to this isolator. This technology, however, is still relatively expensive.

It is therefore generally desirable, not for the plastic bottle itself to be sterilized, but the plastics material pre-form, since the latter has a considerably smaller surface. It is nevertheless necessary for the containers to be conveyed under sterile conditions after they have been sterilized, in particular in a continuous manner, at least until they are closed, in order to prevent a further contamination of the containers in this way.

EP 0 794 903 B1 describes a system and a method for the sterile packing of beverages. In this case a beverage container is formed from a shaped pre-form by blow moulding, next the container is filled with a sterile beverage and finally the filled container is closed with a sterilized closure cap. In this case different degrees of sterilization are controlled in different parts of the chamber, the degrees of sterilization being correlated with the degree which is required for the method step which is being carried out in the part of the chamber respective.

In this production method the entire production process of the bottle and also the filling and closing process are carried out in a continuous manner under sterile conditions. In this case an entire shaping unit of the containers is also arranged in a clean room. This method ensures a high degree of sterilization and cleanness of the containers filled in this way. On the other hand, however, the outlay for the sterilization is relatively high, since on the one hand large spaces have to be kept sterile and on the other hand a multiplicity of machine parts are also present, namely in the region of the blowing apparatus, which have to be kept sterile.

It may therefore be desirable to reduce the outlay for sterilizing or keeping sterile a shaping unit or blow moulding device for containers. On the other hand, however, production conditions as sterile as possible should be created for the containers.

An apparatus described in WO 2010 020 529 A2 for shaping plastics material pre-forms to form plastics material containers has a conveying device on which a plurality of blowing stations are arranged, each of these blowing stations having a blow mould inside which a plastics material pre-form is capable of being shaped to form a plastics material container, and the apparatus having a clean room inside which the containers can be conveyed. In addition, that region of the conveying device on which the blowing stations are arranged is situated in the clean room and a further region of the conveying device is situated outside the clean room.

With this apparatus a clean room duct is thus provided through which the plastics material pre-forms or containers are brought to the blowing stations and a further region of the conveying device is moved outside the clean room. In this way, parts of the shaping unit such as a blow moulding machine, i.e. the blowing wheel as a whole or the blowing cavities, are separated from the rest of the blow moulding machine by a clean room or a closed-off isolator.

The subject matter of WO 2010 020 529 A2 is thus also made completely into the subject matter of the present application by reference. The Applicants have established, however, that although satisfactory results can already be achieved with the above-mentioned apparatus of WO 2010 020 529 A2, a further reduction in the volumes of the clean room is nevertheless possible.

SUMMARY

According to various aspects of the disclosure, an apparatus for shaping plastics material pre-forms to form plastics material containers therefore has a conveying device on which a plurality of blowing stations are arranged, each of these blowing stations having a blow mould and the apparatus having a clean room inside which the plastics material pre-forms can be conveyed. In addition, each blow mould has two lateral parts and a base part, the lateral parts and the base part jointly forming a cavity inside which a plastics material pre-form is capable of being shaped to form a plastics material container. In this case at least the regions of the lateral parts and of the base part which bound this cavity are always arranged inside the clean room. In addition, at least one drive device for moving the lateral parts and/or at least for moving the base part is provided.

According to the disclosure at least one of the drive devices or the driving direction respectively is arranged at least in part outside the clean room and a sealing device is provided which seals the clean room off from a region in which the drive device is arranged. It is therefore proposed according to the disclosure that at least one drive device, which causes an opening or closing movement of the blow mould, should be arranged outside the clean room. In this way, the volume of the clean room can be further reduced as compared with the prior art.

It is preferable in some aspects for a drive device to be provided in order to move the base part, as well as a further drive device in order to move the lateral parts. It would also be possible, however, for only one drive device to be provided and for a movement of the lateral parts to be coupled by way of a coupling device to a movement of the base part. In this case it is possible for this coupling device to be arranged at least in part inside the clean room, but it would also be possible for the coupling device to be provided completely outside or completely inside the clean room.

It may be advantageous for at least one of the drive devices situated outside the clean room to be coupled by way of a coupling device to at least one lateral part or to the base part and for this coupling device to extend through a boundary of the clean room. It may be advantageous for the clean room to be bounded by a wall, in which case the latter can be a flexible or a rigid wall. This wall also advantageously constitutes the boundary of the clean room with respect to the non-sterile outer region. In this case a coupling device is understood to be, in particular, a device which acts mechanically and which transmits a movement of the drive device to the base part or at least one lateral part.

It may be advantageous for the sealing device to have a resilient sealing means. In this way, it would be possible for the coupling device to be for example a rod or a rod assembly and for a sealing means such as for example a folding bellows to be arranged on this rod assembly. In order to use a folding bellows of this type, however, a sealed-tight boundary of the clean room has to be maintained despite a movement of the coupling device. It may be advantageous for at least one portion of the sealing means to follow the coupling device with respect to its movement.

It may be advantageous for the drive device to move the base part or at least one lateral part along a finite path, i.e. along a movement path which has at least one end point and, in some aspects, advantageously two end points (in contrast for example to a movement along a circular or elliptical path).

It may be advantageous for a first drive device to be provided for moving the base part and a second drive device to be provided for moving the lateral part and for the two drive devices to be arranged outside the clean room.

In the case of a further exemplary embodiment the sealing device has a gas barrier. In this case a gas, such as for example water vapour, can be introduced into a region to be sealed off and this water vapour can form a gas barrier.

In addition, however, it would also be possible for a sealing to be carried out by means such as for example so-called water sealing device. In this case a movable element can be guided in a water tank, so that a reciprocating movement is possible without the possibility of a boundary between a sterile and a non-sterile room being crossed by a gas in this case.

In the case of a further exemplary embodiment the apparatus has supply devices for supplying a tempering liquid for the blow moulds and connections for the supply devices are arranged inside the sterile room or clean room. In addition, however, it would also be possible for a clean room boundary to be provided in such a way that the supply devices for supplying the tempering liquid and the connections for the supply devices are all arranged always outside the clean room. It may be advantageous for the base part and, in a preferred aspect, also the lateral parts to be made resistant to cooling water.

It may be advantageous for the apparatus to have a sterilization device which is arranged in front of the actual blowing stations and which sterilizes the individual plastics material pre-forms.

In addition, it is proposed that a blowing wheel of the blow moulding machine, i.e. the region in which a plastics material container is formed out of the plastics material pre-form, should be reworked. In this case a region around the actual shape-imparting region of the machine, i.e. the mould carrier with the blow mould, is enclosed in such a way that this region can be sterilized. In this case it may be advantageous for a sterile room to be defined and for all the media and components which cross the boundaries of this sterile space to be arranged in such a way that a room sterilized once at the beginning of production will also remain sterile. On account of the procedure according to the disclosure it is also possible to prevent grease and surrounding air from penetrating into the sterile room.

In this case, in the region of the base part it is necessary for a reciprocating movement to be carried out in order to be able to shape a blow-moulded container. This reciprocating movement can be actuated by a cam which also has to be greased in the prior art. It may therefore be advantageous for the aforesaid cam to be arranged outside the clean room. Expressed in more precise terms, it is possible for the aforesaid cam to extend below the mould carrier and thus also below the clean room.

Alternatively, it is also possible for the container to be blow-moulded standing on its head by the aforesaid cam for the base part being situated above the mould carrier and thus also above the clean room.

It would also be possible, however, for the drive device to be in the form of other drive devices, such as for example servo motors, hydraulic or pneumatic reciprocating cylinders or the like. Use could also be made of linear motors.

The above-mentioned sterile room boundary between the clean room and the surroundings may be advantageously arranged in such a way that a drive device, for example a cam and a cam roller, will remain outside the sterile room. It may be advantageous for the clean room to be bounded at the bottom by a perforated and advantageously solid boundary.

As mentioned above, this perforation is used at least for the passage of the base unit of the blowing station, and optionally also for the passage of the above-mentioned supply and removal means of the tempering media for the base mould or the base part.

In this case a folding bellows, which ensures that the clean room is closed off from the region of the guide cam, can be provided between the base part and the perforation.

In addition, it would be possible for the aforesaid folding bellows to be fixed at the perforation by a suitable clamping device, for example in the manner of a hose clip. In the event of a change in the product or the mould it would be possible for this side to be made flexible.

In this case it would be possible for the aforesaid folding bellows to project into the interior of the clean room, but it would also be possible for the folding bellows to extend outwards with respect to the clean room.

In the case of a further exemplary embodiment the apparatus has a stressing device which acts upon the plastics material pre-forms with a gaseous medium and this stressing device is arranged inside the sterile room, and, in addition, a drive device for moving the stressing device is provided.

This stressing device can be for example a blowing nozzle which, as known in the prior art, in order to carry out the blow moulding procedure is applied to an opening of the container or even to a blow mould in order to act upon the plastics material pre-form in particular with compressed air. It may be advantageous for the drive device for moving the stressing device to be provided outside the sterile room. A further reduction in the volume of the clean room is possible on account of this procedure. It may be advantageous for a wall which forms the boundary of the clean room to move together with the individual blowing stations.

It is preferable in some aspects to arrange parts of the conveying device specified in a direction at a right angle to the conveying direction (of the containers) inside the clean room and other parts outside.

It is preferable in some aspects for the conveying device to be a conveying wheel which rotates about a pre-set axis, in which case at least the axis or a shaft of the conveying device is arranged outside the clean room. As a result of this, the clean room is kept as small as possible and in this way the internal volume of the clean room can also be kept small. In addition, it is also made possible in this way for the maximum number of machine parts which are not directly in contact with the blowing stations to be guided outside the clean room and also for contamination to be kept low in this way.

It is preferable in some aspects for the clean room to have at least locally an annular profile or a toroidal profile, in which case, however, the cross-section of this toroidal profile preferably deviates from a circular shape. This means that the blowing stations are guided by the conveying device on a substantially circular path.

In the case of a further exemplary embodiment a stretch rod for stretching the plastics material pre-forms is arranged at each blowing station and this stretch rod projects at least for a time and locally out of the clean room. As is known, the stretch rod is used to extend the plastics material pre-forms in the framework of the production process. In principle it would also be possible for the whole of the stretch rod always to be guided in the interior of the clean room. For this purpose, however, the clean room would have to be considerably enlarged in its volume. In the exemplary embodiment it is therefore proposed that the stretch rod should project outwards through an opening in the clean room. In order to prevent contamination of this stretch rod at the same time, it is particularly preferable in some aspects for a folding bellows to be provided, in the interior of which the stretch rod extends, so that the stretch rod itself does not come into contact with the outside environment. Sterile conditions also therefore prevail inside the folding bellows.

It is preferable in some aspects for the clean room to be bounded by a plurality of walls and for at least one of these walls to be arranged so as to be movable and, in particular aspects, rotatable, with respect to a further wall.

It is preferable in some aspects for a wall of the clean room arranged radially on the outside to be arranged so as to be stationary. In this way, a wall with an, in particular aspects cylindrical, external profile which bounds the clean room can be provided. A further wall, which bounds the clean room towards the other side and which is arranged so as to be rotatable, is provided from the interior of the latter wall. It is preferable in some aspects for this wall arranged on the inside to be rotated with the individual blowing stations. It is preferable in some aspects for the above-mentioned rotatable wall and the wall arranged so as to be stationary to be situated opposite each other. In addition, the clean room is bounded by a wall in the form of a cover, this cover, in some aspects, preferably being formed in one piece with the rotatable wall.

It is preferable in some aspects for a sealing device to be arranged between at least two walls or a wall and a cover. In some aspects, this sealing device preferably seals parts off from each other which are movable with respect to each other. In this way, it would be possible for example for a so-called water sealing device, in which is provided a water duct—annular in this case—in which a portion of the part movable with respect to this water duct is guided, to be provided between a wall and a cover.

In the case of a further exemplary embodiment the apparatus has a supply device in order to transfer the plastics material pre-forms to the conveying device, and this supply device is arranged inside the clean room. In some aspects, the clean room preferably has a protrusion or a deviation from the otherwise circular cross-section, and the supply device, such as for example a conveying star wheel for the pre-forms, is arranged accordingly in this protrusion. In this way, an unbroken transfer of the containers from the supply device to the conveying device inside a sterile room is possible.

In the case of a further exemplary embodiment the apparatus also has a removal device in order to take on the formed plastics material containers from the conveying device, and this removal device is likewise arranged inside the clean room. In this way it is possible to preserve a clean room even when the containers are removed. In this way it is possible for the introduction of pre-forms from plants mounted in front into the isolator or clean room and for the delivery of the bottles to a following unit under clean room conditions to be possible. The isolator or clean room can be acted upon with cleaning and sterilization media.

In the case of a further exemplary embodiment a sterile gas is provided inside the clean room and this sterile gas is under a pressure which is higher than a pressure outside the clean room. In this way the clean room can optionally be kept at a higher pressure level than the surroundings by the introduction of sterilized air, as a result of which it is possible for the penetration of micro-organisms to be prevented. In addition, it is possible for an antimicrobial active agent to be continuously fed to the clean room and for an hygienic environment to be maintained in this way.

As a result of a spatially limited clean room in the blow mould apparatus it is possible for previously sterilized pre-forms to be conveyed to the filling means both outside and inside the stretch blow moulding procedure without re-contamination. In addition, as compared with the shaping apparatus as a whole, the clean room is easier to keep to a low level of germs.

The present disclosure further relates to a plant for producing plastics material containers, which has an apparatus for shaping plastics material containers of the type described above, as well as a heating device, this heating device being arranged in a conveying device for the plastics material pre-forms upstream with respect to the apparatus mentioned above. This heating device is used to heat the pre-forms so that they can then be expanded in a blow moulding procedure to form containers. A filling device, which fills the containers with a beverage, in particular with an aseptic product, is provided downstream or after the shaping apparatus. In this case, this filling device is also arranged in a clean room. In addition, in some aspects, the clean room preferably extends into the region of a closure device which closes the containers with a closure.

In addition, in some aspects, the plant preferably has a sterilization device which sterilizes at least one region of the plastics material pre-forms before they reach the apparatus. In this case this sterilization can be carried out with a gaseous medium, such as in particular hydrogen peroxide. It would also be possible, however, for the sterilization to be carried out using radiation, such as for example electron beams and/or UV light. In this case it is preferable for a sterilization device to be provided which in particular also sterilizes the inner surface of the plastics material pre-forms. Furthermore, however, the outer surface of the plastics material pre-forms can also be sterilized.

In the case of a further exemplary embodiment the plant has a further clean room which is arranged upstream of the above-mentioned apparatus in the conveying direction of the plastics material pre-forms. It is preferable in some aspects for this further clean room to pass into the clean room of the shaping device. In this way, it is possible for the plastics material containers to be conveyed in a continuous manner starting from their sterilization until their closure and at the same time for the clean rooms required for this to be kept relatively small. In some aspects, it is preferable for the clean room to be provided in the form of a channel which extends from the sterilization device to the closure device and which in a particularly preferred aspect is adapted in each case to the corresponding blowing stations or holding devices such as gripping elements for the pre-forms or plastics material containers.

The present disclosure further relates to a method of shaping plastics material pre-forms to form plastics material containers, in which the plastics material pre-forms are conveyed by means of a conveying device, on which a plurality of blowing stations are arranged, and they are shaped to form plastics material containers during this conveying. In this case the blowing stations are conveyed at least locally and, in some aspects, preferably completely through a clean room.

In this case the blowing stations in each case have blow moulds, the blow moulds having two lateral parts and one base part. The lateral parts and the base part together form a cavity, inside which the plastics material pre-form is shaped to form the plastics material container. In this case the regions of the lateral parts and the base part bounding the cavity and, in some aspects, preferably the entire lateral parts and the base part are always situated inside the clean room. According to the disclosure at least the lateral parts or the base part is or are moved in a drive device which is situated at least in part and, in some aspects, preferably completely outside the sterile room.

It is preferable in some aspects for at least one region of the conveying device also to be moved outside the clean room. In the case of a further exemplary method the blowing stations are moved on a circular path and, in some preferred aspects, permanently inside the clean room.

Further exemplary embodiments and advantages may be evident from the accompanying drawings.

BRIEF DESCRIPTION OF THE DRAWINGS

In the drawings:

FIG. 1 is a diagrammatic illustration of a plant for producing plastics material containers according to the prior art;

FIG. 2 is a view of a clean room in the region of a blowing station, according to the prior art;

FIGS. 6a-6d show a mould carrier actuation means in a further embodiment;

FIGS. 8a-8d are illustrations of a drive for the base part.

DETAILED DESCRIPTION

Figure 3A:
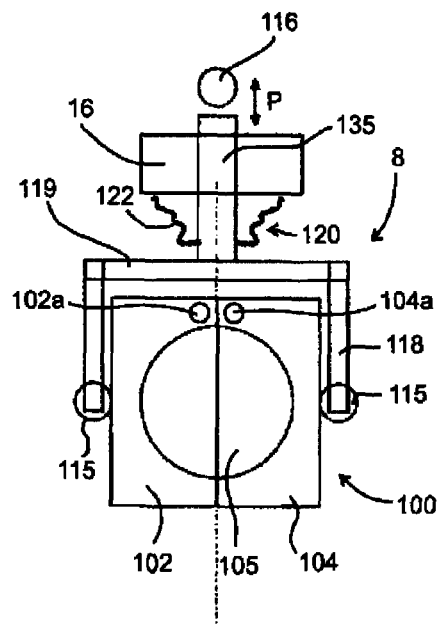
FIGS. 3a-3f are six diagrammatic illustrations of an apparatus according to the disclosure.

FIG. 1 is a diagrammatic illustration of a plant according to the prior art for producing plastics material containers. This plant 50 has a heating device 30 in which plastics material pre-forms 10 are heated. In this case these plastics material pre-forms 10 are guided through this heating device 30 by means of a conveying device 34, such as in this case a circulating chain, and they are heated by a plurality of heating elements 31 during this. This heating device 30 is followed by a transfer unit 36 which transfers the pre-forms 10 to a sterilization device 32. In this case this sterilization device 32 likewise has a conveying wheel 37, and sterilization elements can be arranged on this conveying wheel 37 or even in a stationary manner. In this region for example sterilization by hydrogen peroxide gas or even, as mentioned above, by electromagnetic radiation is possible. In particular, an internal sterilization of the pre forms is carried out in this region.

The reference number 6 designates in its entirety a clean room, the external boundaries of which are indicated by the dotted line L. It is evident that this clean room 6 starts in the region of the sterilization unit 32. Switching devices can be provided in this region in order to introduce the plastics material pre-forms into the clean room 6 without an excessive amount of gas being lost inside the clean room during this.

The clean room is, as indicated by the broken line L, adapted to the external shape of the individual components of the plant. In this way, the volume of the clean room can be reduced.

The reference number 1 designates in its entirety a shaping device in which a plurality of blowing stations 8 are arranged on a conveying wheel 2, only one of these blowing stations 8 being illustrated here. The plastics material pre-forms 10 are expanded by these blowing stations 8 to form containers 20. Although it is not shown in detail in this case, the entire region of the conveying device 2 is not situated inside the clean room 6, but the clean room 6 or isolator is designed as it were in the form of a mini-isolator inside the apparatus as a whole. In this way it would be possible for the clean room to be designed in the manner of a channel, at least in the region of the shaping device 1.

The reference number 22 relates to a supply device which transfers the pre-forms to the shaping device 1, and the reference number 24 to a removal device which removes the produced plastics material containers 20 from the shaping device 1. It is evident that in the region of the supply device 22 and the removal device 24 the clean room 6 has recesses in each case which receive these devices 22, 24. In this way, a transfer of the plastics material pre-forms 10 to the shaping device 1 or a taking-on of the plastics material containers 20 from the shaping device 1 can be achieved in a particularly advantageous manner.

The expanded plastics material containers are transferred by a transfer unit 42 to a filling device 40 and are then removed from this filling device 40 by way of a further conveying unit 44. In this case the filling device 40 is also situated inside the aforesaid clean room 6. In addition, in the case of the filling device it would be possible, not to arrange the entire filling device 40 for example with a reservoir for a beverage completely inside the clean room 6, but also in this case only those regions in which the containers are in fact conveyed. In this respect the filling device could also be designed in a similar manner to the apparatus 1 for shaping plastics material pre-forms 10.

As has been mentioned, the clean room 6 is reduced in the region of the apparatus 1 to an area as small as possible, namely substantially to the blowing stations 8 themselves. On account of this small-scale design of the clean room 6 it is possible in an easier and more rapid manner for a clean room to be produced in any case, and, in addition, the sterilization in the operative phase is less complicated. In addition, less sterile air is necessary, and this leads to smaller filter plants and the risk of uncontrolled swirling is also reduced.

FIG. 2 is a detailed illustration of the apparatus 1 in the region of a blowing station 8. A plurality of blowing stations 8 of this type are moved by a conveying device 2 so as to rotate about an axis X. As shown in FIG. 2, the blowing station 8 is guided inside the clean room 6 which in this case is designed in the manner of a channel. This clean room 6 is closed off by a movable lateral wall 16 and a cover 17 formed in one piece with this lateral wall 16. In this case this lateral wall 16 and the cover 17 rotate jointly with the blowing station 8.

The reference number 18 relates to a further wall, which borders the clean room 6. This wall 18 is in this case a wall which is situated on the outside and which is arranged in a stationary manner. A sealing device 25, which seals the mutually movable cover 17 and wall 18 off from each other, for example, as mentioned above, using a water sealing device, is provided between the elements 17 and 18. The upper region of the wall 18 is arranged on a base 13 in a fixed and sealed manner. A carrier 26, which is likewise moved in a rotating manner and on which in turn is provided a holding device 23 which holds the blowing stations 8, is provided inside the clean room 6 and in this case directly adjacent to the wall 16.

The reference number 11 relates to a follower device which can be actuated by a guide cam 9 in order to open and close the blowing station on its path through the clean room 6, in order, in particular, to insert the plastics material pre-form into the blowing station and also to remove it again. In this case a guide cam 9 is also arranged inside the clean room 6. However, it would also be possible for example, however, for a portion 19 to be produced below the individual blowing stations 8 out of the clean room 6.

The conveying device 2 can have still further elements which are arranged above the clean room 6.

In this case the carrier 26 is arranged on a holding member 29 in a fixed manner and this holding member in turn is movable with respect to the base 13. The reference number 27 relates to a further sealing device which in this region too forms a seal of the mutually moving regions 13 and 29.

The reference number 5 relates to a stretch rod which is movable with respect to the blowing station in order to stretch the plastics material pre-forms 10 in the longitudinal direction thereof. In this case a slide 12, opposite which the stretch rod is movable in the direction Y, is arranged on the cover 17. The reference number 14 relates to a further holding means for this slide 12 of the stretch rod 5.

It is evident that specific regions of the stretch rod are both outside the clean room 6 and inside the clean room during the blow moulding procedure. For this purpose it is possible for a protective device, such as a folding bellows, which surrounds the stretch rod 5, to be provided outside the clean room 6 and above the slide 12, so that no region of the stretch rod 5 will come directly into contact with the external environment.

The heating device mentioned above for heating the plastics material pre-forms is preferably likewise made aseptic in some aspects. This means that the plastics material pre-forms can already be guided through a clean room in the region of the heating device 30, in contrast to what is shown in FIG. 1, and this clean room extends continuously for example over the blow moulding machine as far as the filling means. In this case it is possible for the entire heating device 30 to be arranged inside a sterile room, but it would also be possible in this case too, in particular, for the region in which the plastics material pre-forms are conveyed to be enclosed as a sterile room with respect to the surroundings. In this way it would be possible for example for the plastics material pre-forms to be conveyed by means of mandrels which engage in their opening, and during this for the mandrels to project through a wall into a clean room. This clean room could likewise be acted upon with an over-pressure, so that no surrounding air can penetrate into this clean room.

In this case the heating device could be designed in the form of an infrared heating device, as shown in FIG. 1. It may be advantageous, however, for a microwave heating device to be used as the heating device. Microwave heating devices of this type for heating plastics material pre-forms are known per se from the prior art. In this case a plurality of microwave heating devices could be arranged for example on a carrier wheel. The plastics material pre-forms could be supplied to these individual heating stations by way of switches. On account of the design with individual heating stations a microwave-based heating device is particularly suitable for the combination with sterile rooms.

FIG. 3a is a plan view of a blowing station 8 according to the disclosure. In this case this blowing station has a blow mould 100 (shown highly simplified and without a carrier) with a first lateral part 102 and a second lateral part 104 which pivot about pivot axes 102a and 104a in each case. In their interior the two lateral parts form a cavity 105 in which plastics material pre-forms can be expanded to form plastics material containers. In this case arms 118 are arranged on the two lateral parts 102 and 104 by way of joints 115 in each case, these arms being provided in turn on a main arm 119. The reference number 116 relates to a drive device which moves a rod 135 acting as a coupling device in the direction of the double arrow P, this rod 135 also moving the arms 118 and 119. The two lateral parts 102 and 104 can be pivoted apart from each other and together by the movement of this rod 135.

The reference number 120 designates a sealing device with a folding bellows 122 which is arranged on the coupling device 135 at one end and on a boundary wall 16 at the other end. In this case this boundary wall 16 separates the clean room—in which the blowing station 8 is arranged—from the non-sterile room—in which the drive device 116 is provided. In this way, a sealing device 120 is provided which screens off an opening mechanism, which is associated with the blow mould or the mould carrier, from the conveying path of the containers or pre-forms.

The folding bellows 122 comprises a material which is selected from a group of materials which includes plastics materials, EPDM, natural rubber, elastomers, rubber or steel. In this case the folding bellows 122 can be designed in the form of a diaphragm bellows or a corrugated bellows or a combination thereof.

Figure 3B:
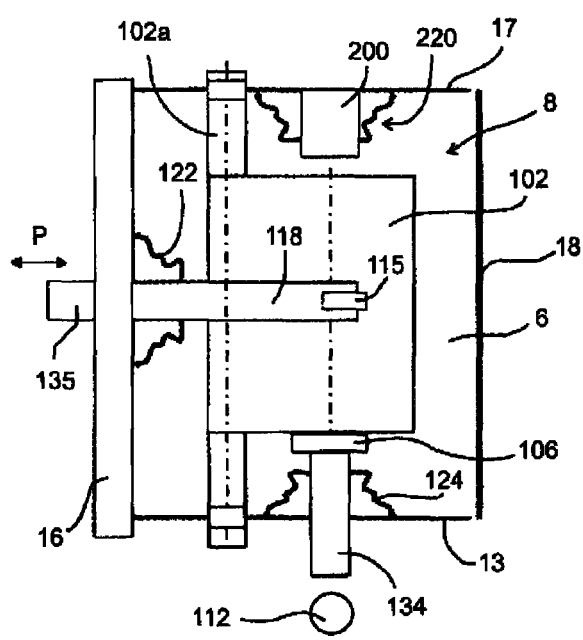

FIG. 3b is a side view of the apparatus shown in FIG. 3a. In the case of the illustration shown in FIG. 3b a drive device 112 is additionally evident which moves a coupling device 134, in which case a base part 106 which is likewise used for closing the cavity 105 is arranged in turn on the coupling device 134. The reference number 13 again designates a lower wall of the clean room which is designated 6 in its entirety and through which the coupling device 134 extends. The reference number 124 again designates a sealing device such as a folding bellows which seals off this movement of the coupling device 134 from the wall 13.

The reference number 18 again designates a wall which is arranged radially on the outside and which in this case is arranged vertically. The walls 13 and 17 as well as the wall 16 rotate jointly with the individual blowing stations 8. It is evident that the clean room 6 is designed to be relatively narrow around the blowing stations, so that a very small volume has to be kept sterile. Altogether three sealing devices 122, 124, 220 are provided in this case, more precisely also a further sealing device 220 which is used for sealing off the movement of a blowing nozzle 200. A further coupling device 135 couples the lateral parts 102, 104 to the drive device 110. The reference 102a designates in turn the pivot axis for pivoting the lateral part 102.

Figure 3C:
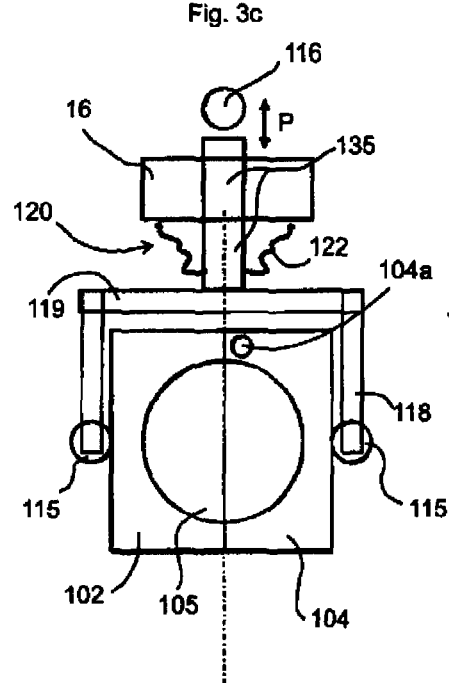
Figure 3D:
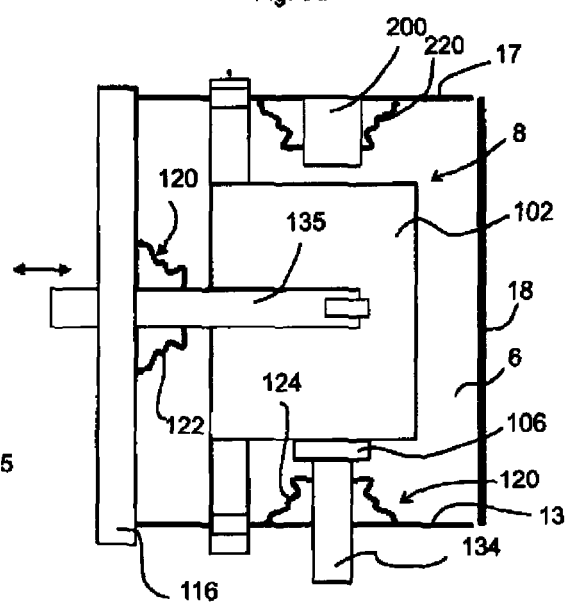

FIGS. 3c and 3d show a further embodiment of an apparatus according to the disclosure. In this case only the lateral part 104 is pivoted about its pivot axle 104a, and the lateral part 102 is held non-pivoted. In addition, in this case too an arm can again be provided which is moved along a double arrow P by a drive device 116 in order to open the lateral part 104 with respect to the lateral part 102 provided in a stationary manner. Furthermore, locking devices can also be provided which lock the lateral parts 102, 104 to each other in the closed state. In addition, the drive device for a locking mechanism of this type can be arranged outside the clean room 6.

Figure 3E:
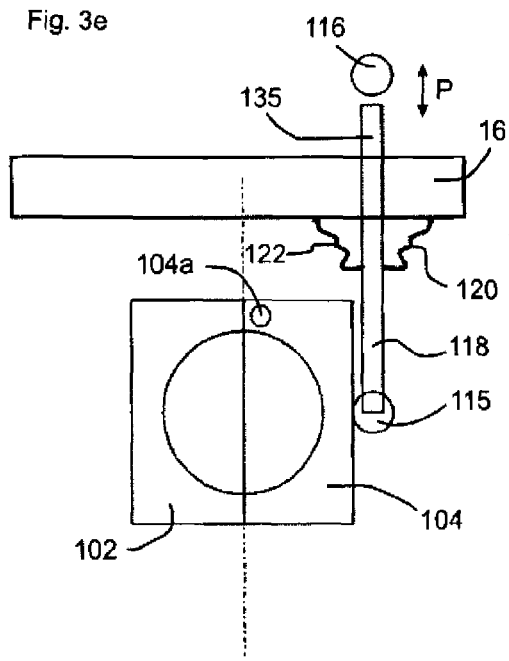
Figure 3F:
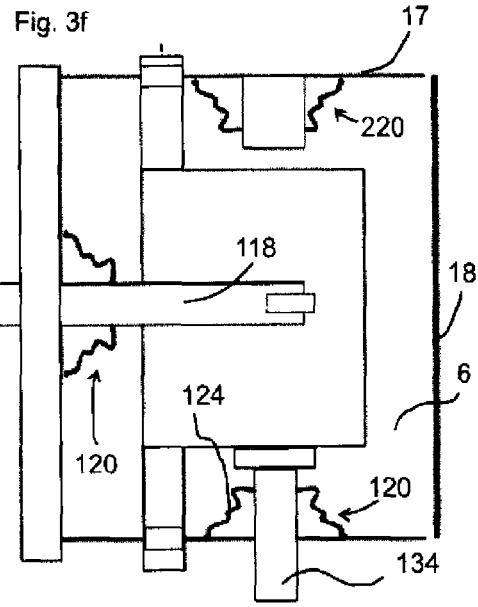

In the case of the embodiment shown in FIGS. 3e and 3f only the lateral part 104 is pivotable with respect to the pivot axle, i.e. in order to open and close the blow mould only this lateral part 104 is pivoted, whereas the other lateral part 102 remains non-pivoted. Here too, only one arm 118, which is articulated to the lateral part 104, is therefore provided. In this case it is possible for the arm to be moved with a larger stroke than the two arms 118 in the case of the embodiments shown in FIGS. 3a to 3d.

Figure 4:
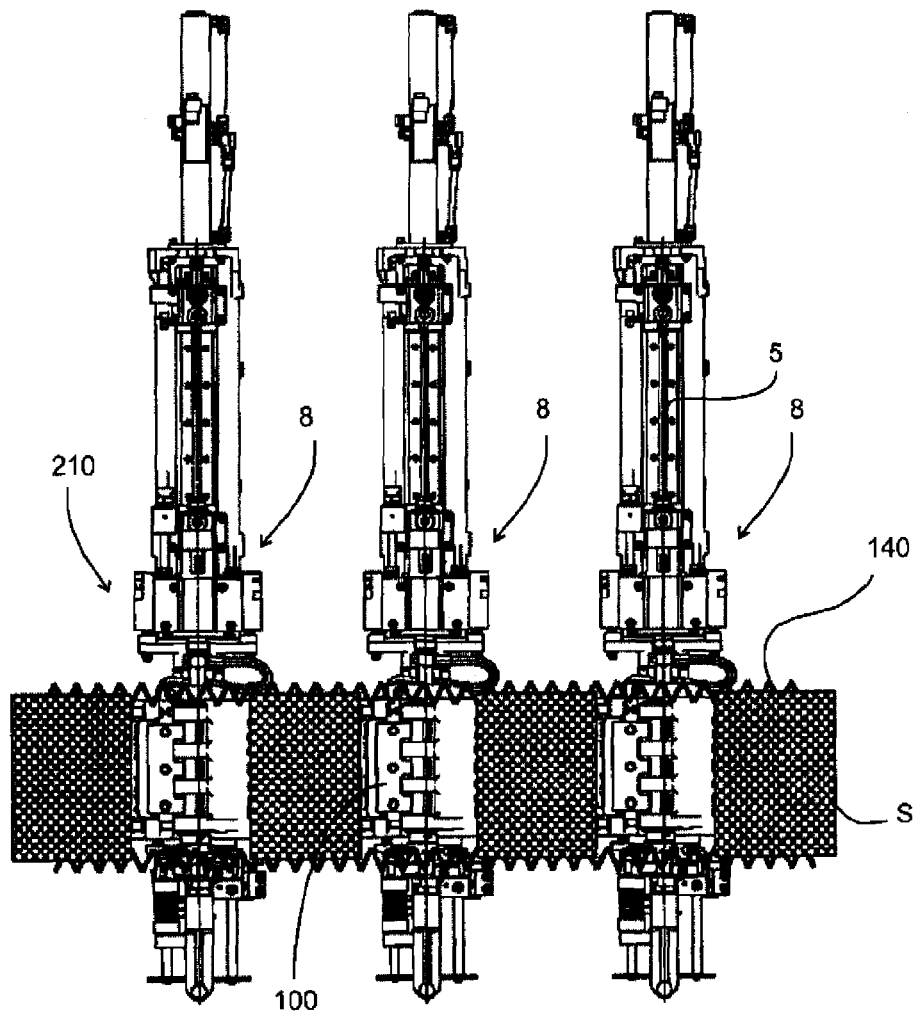
FIG. 4 is a side view of an apparatus according to the disclosure.

FIG. 4 is a diagrammatic illustration of a plurality of blowing stations 8. In this case the hatched area relates to the sterile room boundary S between the clean room and its surroundings. In an exemplary embodiment the upper sterile room boundary 140 can also be situated at the level of the valve devices 210.

The reference number 5 designates a stretch rod which in this case is situated in part outside the clean room, but it can move into the interior thereof. In addition, the individual blow moulds or blow mould carriers 100 are again shown, which, as mentioned above, are used for expanding the plastics material pre-forms. In this way, a clean room is again also present here around the blowing station with the blow moulds. Furthermore, a rotating blowing wheel is also provided in this case with a plurality of cavities in which the pre-forms are expanded to form containers.

Figure 5A:
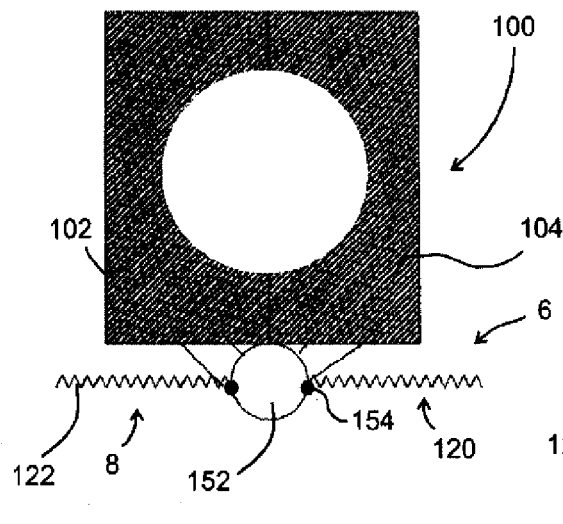
FIGS. 5a-5c are illustrations of a mould carrier actuation means.

FIG. 5a shows a further embodiment of a blowing station 8 according to the disclosure. In this case the two lateral parts 102 and 104 are provided so as to be pivotable by means of a pivot axle 152. The sealing device 120, which in this case is likewise made resilient, extends through this aforesaid rotation axle 152. This means that the axle is situated in part inside the clean room 6 and in part outside the clean room 6. The rotation axle 102 can have two shafts rotatable one in the other, in which case the lateral part 102 is coupled to one shaft and the lateral part 104 is coupled to the other shaft. These two shafts can be rotated with respect to each other in order to open the blow mould 100, or to close it respectively, in this way. In this case the seal can also be arranged in the rotation axle 152.

Figure 5B:
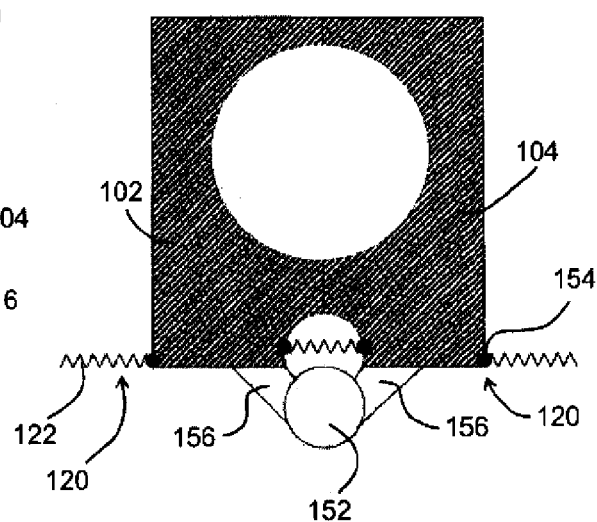

FIG. 5b shows a further embodiment of a blow mould according to the disclosure. In the case of this embodiment the sealing device 120 also extends through a region of the two lateral parts 102 and 104, i.e. portions of these lateral parts 102 and 104 also act in this case as a seal between the clean room 6 and the surroundings of the clean room. Here, too, the sealing device can touch the mould carriers of two adjacent blowing stations. In this case it is possible for the sealing device, if it is made of metal, to be welded onto the respective mould carrier.

Figure 5C:
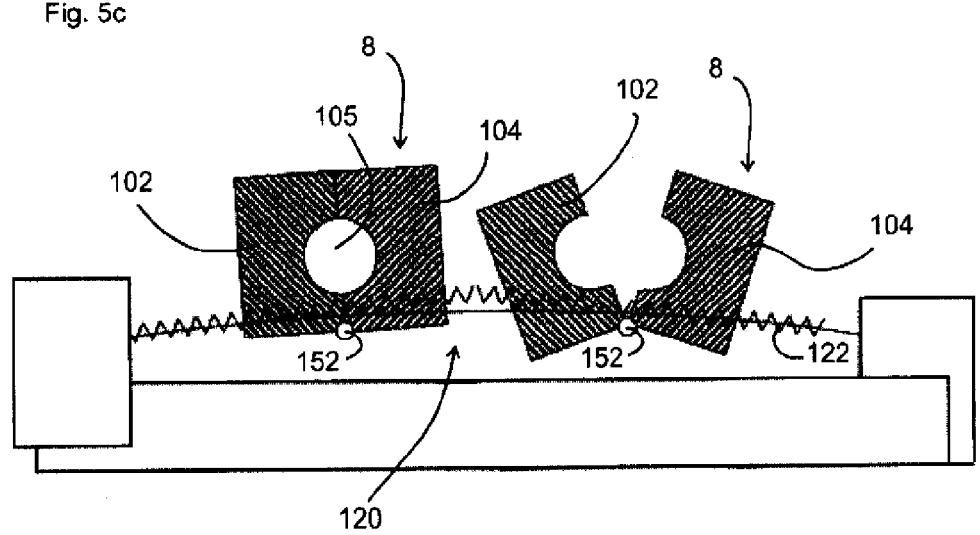

FIG. 5c illustrates an opening procedure for a blow moulding machine according to the disclosure. It is evident in this case that the respective pivot axles 152 of the two blowing stations 8 are situated outside the clean room 6 and the cavities 105 in which the containers are moulded are always situated inside the clean room 6. In this case too the pivot axle is a common pivot axle of the two lateral parts, i.e. the two lateral parts may be advantageously pivoted here. The actual drive for the pivoting movement is not shown in FIG. 5c, but it can engage for example by means of cam rollers or even by means of motors on levers which are arranged on the pivot axle 152. In this case too it is possible for the pivot axle 152 to be designed in such a way as to provide two rods which are arranged one in the other and to which the two lateral parts 102 and 104 are articulated in each case. In the case of the embodiment shown in FIGS. 5a to 5c the sealing device 120 can also be arranged, for example in the form of a folding bellows 122, in part between the lateral parts or the mould carrier halves of the blow mould.

FIG. 6a shows a further embodiment for actuating the opening and closing procedure of the lateral parts 102 and 104. In the case of this embodiment a drive 104 is provided in the form of a reciprocating drive, for example a pneumatic or hydraulic cylinder, which moves a carrier 176 or a base part 176 along the direction P1. Two lateral guides 172 and 174 extending slightly obliquely in this case are provided on the carrier 176. The reference number 156 designates an arm on which the lateral part 102 is arranged.

During a movement forwards, i.e. in a direction opposed to the direction indicated by the arrow P3 in FIG. 6c, these two guide parts 172 and 174 press the two lateral parts 104 and 102 together and thus close the blow mould 100. At the same time the two guide parts 172 and 174 also produce a locking of the blow mould since an opening thereof is possible only when the two guide parts 172, 174 are withdrawn downwards again. In this case the sealing device 123 extends at least in part between the base part 176 and the two lateral parts 102 and 104. In addition, the sealing device can also be attached to the base part 176 on the left and right. In this way, the drive device can also be arranged completely outside the clean room in this case.

During operation the direction P3 preferably extends at least also in a horizontal direction. In this way, the lateral parts 102 and 104 are thus closed from the rear. The guide parts 172, 174 therefore move at least in part in this case in a radial direction with respect to a rotation axle of a blowing wheel on which the individual blowing stations are arranged. It would also be possible, however, for the two guide parts 172, 174 to be brought up to the lateral parts from below and for the lateral parts to be closed in this way. It would also be possible for a further cup locking means 172, 174, 176 of this type (provided alternatively or in addition) in FIGS. 6a to 6b to close or lock the blow mould 100 from above. The movement directions—illustrated here—of the guide parts 172, 174 are capable of being applied in all the embodiments shown in FIGS. 6a to 6d.

FIG. 6b shows a further design of a closure mechanism for the blow mould. In the case of this embodiment a sealing device 120 is again provided, which in this case engages on the coupling device 134. In this way, the two guide parts 172 and 174 as well as the base part 176 are also arranged completely inside the clean room 6 here. A further sealing device 127 would be arranged between the two lateral parts 102 and 104 in this case, but this is not absolutely necessary.

In the case of the embodiment shown in FIG. 6c the apparatus does without a drive means which passes through the clean room boundary S. Instead, co-operating magnets 116, 182 are provided here which have the effect that for example the base part 176 can be drawn towards the rear along the arrow P3 in order to open the blow mould in this way. If the drive device 104 is designed in the form of a magnet in this case, it would also be possible, by a suitable magnetization, to achieve a repelling effect and thus to close the blow mould 100. In addition, in the case of the embodiments shown in FIGS. 6a to 6c the mould carrier can be produced from high-grade steel. Furthermore, the mould carrier can have smooth surfaces in this case in order to simplify the closing and opening procedures. In this way, a U-shaped locking means is provided here.

The inclination of the two guide parts 172 and 174 in this case is at an angle a of between 2° and 20°, in some aspects between 2° and 10°, and in still other aspects between 2° and 8°, with respect to a direction at a right angle to the base part 176.

FIG. 6d shows a further embodiment for a blow mould mechanism of this type. In the case of this embodiment the two lateral parts 102 and 104 are articulated to separate pivot shafts 156, 158. In this case too a sterile room boundary S is not separated by mechanical components, so that the base part 176 is also arranged completely inside the clean room 6.

FIGS. 7a to 7d show illustrations to explain the specific design of the clean room 6 in which the blow mould 100 is arranged. Here again the wall 18 is evident which is arranged in a stationary manner and which separates the clean room 6 from the surroundings U. The reference numbers 166 and 168 relate to so-called water sealing device which allow the clean room 6 to be sealed off. For this purpose, annular channels 166a and 168a are provided in each case, into which likewise annular segments 168b and 166b dip. A liquid medium, such as for example water, is present in the annular channels 166a and 168a. In the case of this embodiment the channels move. It would also be possible, however, for the channels to be provided on the wall 18 and thus to be stationary.

The reference number 5 relates to a stretch rod which is likewise capable of being inserted in the clean room 6. The reference number 200 designates a blowing nozzle which is capable of being mounted on the blow mould or the containers to shape the plastics material pre-forms, in order to act upon the plastics material pre-forms arranged therein with compressed air in this way. The stretch rod 5 is moved by means of a slide 12 which is arranged so as to be movable on a carrier 14. The reference number 212 relates to the drive device which in this case moves the blowing nozzle 200 along the double arrow P4. In addition, the drive device 112 is also shown, which is used for moving the base part 106, as well as the drive device 116 which is used for moving the two lateral parts of the blow mould 100.

Figure 7A:
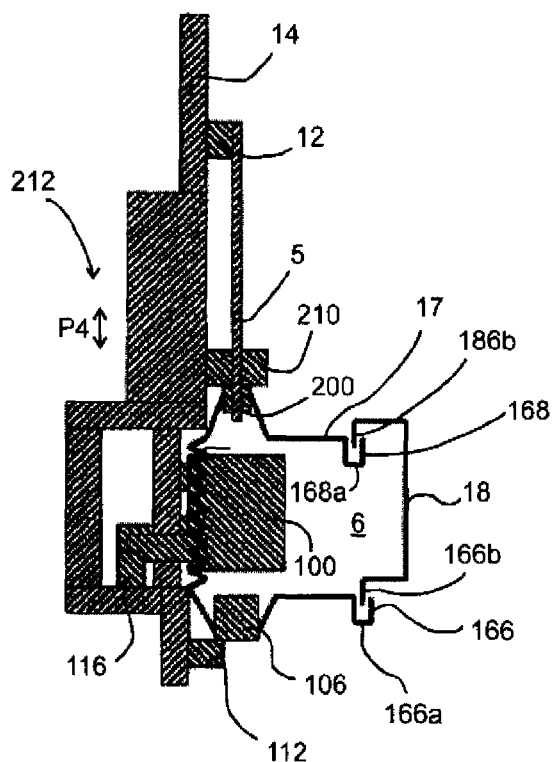
FIGS. 7a-7c are three diagrammatic illustrations of an apparatus according to the disclosure.
Figure 7B:
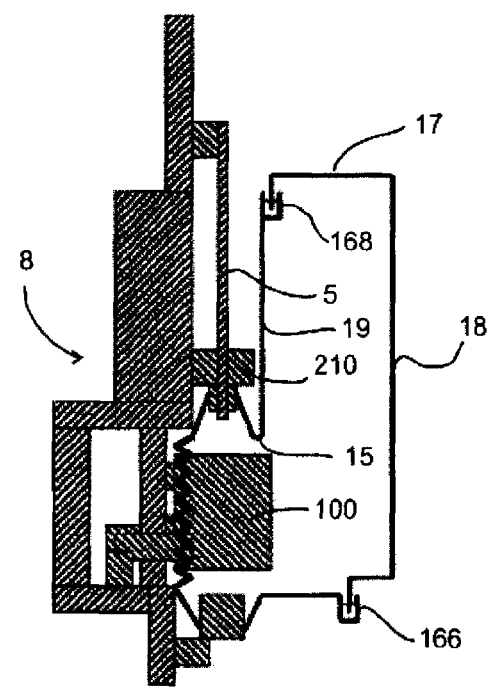

FIG. 7b shows a further arrangement of a blowing station 8 according to the disclosure. It is evident that in this case the upper surge tank 168 also shown in FIG. 7a is offset upwards to a very large degree, in order to facilitate accessibility for the user for example in the event of changing the blow mould. In addition, it is also possible in this case for the wall 18 or a hood, a component part of which is this wall 18, to be raised as a whole in order to allow the blow mould to be changed in this way. The clean room has a bend 15 here which is arranged between the cover 17 and the vertical wall 19. In this case the vertical wall 19 is situated above the valve device 210 and is a maximum of 50 cm, and in some aspects a maximum of 25 cm, away from the stretch rod 5.

Figure 7C:
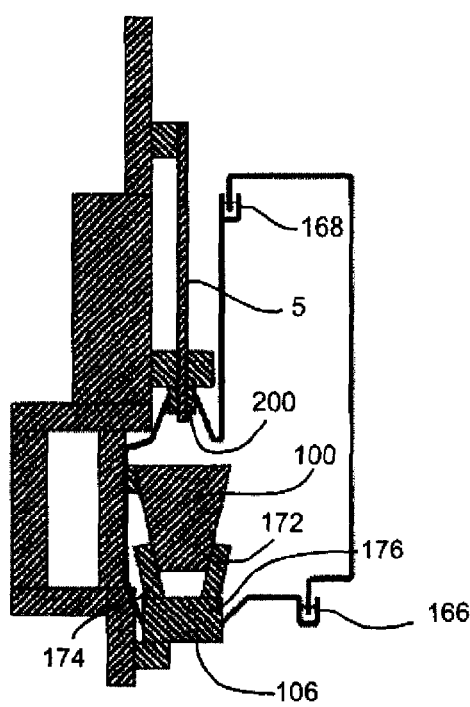

FIG. 7c shows a further embodiment of an apparatus according to the disclosure. In the case of this embodiment the advancing of the base part 106 to the blow mould 100 is combined with a closure of the lateral parts of the blow mould. In this way, a cup locking means is provided here which in the event of an upward movement of the two lateral guides 172, 174 also closes the lateral parts of the blow mould at the same time. It may be advantageous in this case for the blow mould 100 to have smooth outer faces along which the lateral guides 172, 174 can slide more easily. In this case too the upper water sealing device 168 is shown relatively far towards the top. A combination with the embodiment of the two water sealing devices 166, 168, however, would also be possible here. In this case plastics material slide bearings, which in contrast to running rollers assist an hygienic design, are arranged on at least the base part 176 or one of the lateral parts 102, 104. Running rollers, however, would also be possible. This principle could likewise be applied to the blowing nozzle 200.

FIGS. 8a to 8d show four embodiments of the movement of a base part 106. In the case of the embodiment illustrated in FIG. 8a, a sealing medium 120 in the form of a folding bellows 124, which is arranged on a region 129 of the wall of the sterile room here, is again provided. Connecting lines 162, by way of which a tempering medium such as for example a cooling liquid can be supplied to the base part 106, are also guided between the sealing medium 120 designed in this case in the form of a folding bellows and the coupling device 134. In this way, in the case of this embodiment the aforesaid supply lines 162 and also the terminals of the supply lines are guided on the base part 106 outside the sterile room. The supply lines 162 can be provided here in the form of flexible hoses which are taken along in the event of movement of the base part 106. The reference number 112 in turn designates the drive device which effects the movement of the base part 106.

Towards the mould the sealing device 120 can thus be attached in the form of a folding bellows 124 in the case of one embodiment below the base cup and the centring ring of the base part 106, but above the terminals for the tempering media, and so in the middle of the base unit. This may have the advantage that the supply of the tempering media (as a rule by hoses) would not have to be placed in the sterile room. A drawback would be that the base unit 106 would have to be dismantled when changing the mould, and solutions beyond the present-day mould standard would have to be found. In particular, the escape of tempering medium into the sterile room 6 has to be taken into consideration here.

A way around this drawback would be provided by a design (cf. FIG. 8c) in which the folding bellows 124 is designed in such a way that the base unit 10b can be inserted through the upper hole in the bellows and comes to rest in a properly fitting manner on the cylinder face below the centring ring 163 and above the attachment flange 161 for the tempering media. Fixing could be carried out in the sterile room by a sort of hose clip.

In this case the wall region 129 can be screwed to the base part 106 or a carrier of the base part in a fixed manner. The reference letter S designates in turn the boundary of the clean room 6 with respect to the surroundings thereof.

FIG. 8*b* shows a further embodiment of the blow mould arrangement. In the case of this embodiment the sealing means 120, i.e. the folding bellows 124, is applied to an underside of a carrier 107 of the base part 106. In this case the supply lines 162 are guided inside the sterile room 6. The respective supply lines are therefore arranged in a tightly sealed manner here in the form of apertures screwed in a fixed manner. The reference number 167 designates a coupling member which is used for guiding the supply lines 162 through the sterile room boundary S or a corresponding wall. In this case, too, the supply lines 162 are, in some aspects, preferably made flexible, so that in both end positions of the base part no mechanical stresses can be exerted upon the coupling device 167 through the supply lines 162 (expressed more precisely, a supply line and a removal line for the tempering medium are involved). The reference number 169 designates quick-action couplings.

In this case the reference number 112 again designates the drive device which in this embodiment, too, is arranged completely outside the clean room 6.

The embodiment shown in FIG. 8*c* again resembles the embodiment shown in FIG. 8*a*, in which case, too, the arrangement of the sealing means 120 on the base part is illustrated. The reference number 139 designates a clamping means by which the wall region 129 is arranged on the base part, such as for example a hose clip.

FIG. 8*d* shows a further embodiment of an apparatus according to the disclosure. In this embodiment too the supply lines 162 and the terminals are guided on the base part inside the clean room 6.

The complete base unit 106 would be inside the sterile room 6 here. In this way the base unit 106 could be placed in the sterile room 6 as also in the case of a standard machine, in which case the quick-action couplings 169 are attached to the hoses (or tubes) attached in the sterile room in a fixed manner.

In the case of the latter design (cf. FIG. 8*d*), instead of a folding bellows 124 a seal of the passage of the base stroke into the sterile region can also be made through a seal 125, since only an individual axle is moved into the clean room 6 and out of it. Since the sterile region boundary is traversed repeatedly, an additional gas barrier 125 may be advantageous in the case of a solution of this type in order to destroy organisms possibly adhering to the shaft before they can pass through the sterile boundary S.

In all cases the sealing device 120, 122, 123, 124, 125, 220 may be advantageously produced from temperature-resistant material (thermal resistance>121° C.).

A moisture barrier, a steam condensate barrier or a shut-off means with other disinfection means would also be possible instead of a gas barrier 125.

Sealing-off the clean room 6 with respect to the surroundings is again achieved by this gas barrier 125, in which case the sealing action is attained by the medium of this seal, for example steam. In the case of all the embodiments and, in particular, in the case of those shown in FIGS. 8*a* to 8*d*, the apparatus could have a centring means produced from plastics material. In this case this centring means could be arranged for example on the base part 106.

As mentioned above, the mould carrier or the blow mould can additionally have a locking device which locks the two lateral parts against each other. As a result of the sealing device it is made possible for no germs or impurities to pass from the surroundings into the clean room 6. To this end the individual mould carrier halves could have mountings in each case, and these mountings can also be arranged inside the clean room 6 and they are sealed off from the surroundings by means of a sealing device or a barrier. The mounting can also, however, as illustrated in part, be arranged outside the clean room.

Furthermore, it would also be possible, with respect to the base form, for the aforesaid tempering media to be supplied to the base part 106 though the coupling device. In this way, the interior of the coupling device 134 could have a cavity through which a tempering medium can be conveyed. The sealing devices 120, 122, 123, 124, 125, 220 illustrated within the framework of the figures are in particular in the form of folding bellows 122, 123, 124, but it is also possible for a gas barrier, a steam barrier, a steam condenser barrier or a liquid shut-off means 125 to be involved. In addition, the sealing device 120, 122, 123, 124, 125, 220 may be advantageously temperature-resistant. The base form 106 and the other components may also be advantageously made temperature-resistant. Furthermore, it is also possible for the heating of parts of the blow mould 100 to be carried out by way of a cooling circuit, and this can be provided depending upon the application.

In this case, as mentioned in the introduction, the base part 106 can be actuated by way of a base cam. In this case it would also be possible for a suitable lifting device or coupling device 134 to be insulated in such a way that heat introduced is not transferred into the linear guide.

It will be apparent to those skilled in the art that various modifications and variations can be made to the apparatus for treating containers of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for shaping plastics material pre-forms to form plastics material containers comprises:
   a conveying device;
   a plurality of blowing stations arranged on the conveying device, each of the blowing stations having a blow mould, each blow mould having two lateral parts and a base part, the lateral parts and the base part jointly forming a cavity inside which a plastics material pre-form is capable of being shaped to form a plastics material container;
   a clean room inside which the plastics material pre-forms can be conveyed, at least regions of the lateral parts and of the base part which delimit said cavity being always arranged inside the clean room;
   at least one drive device which causes an opening or closing movement of the blow mould by moving at least one of the lateral parts and the base part, the drive device being arranged at least in part outside the clean room; and
   a sealing device which seals the clean room off from a region in which the drive device is arranged.

2. An apparatus according to claim 1, further comprising a coupling device, said at least one drive device situated outside the clean room is coupled by way of the coupling device to at least one of the lateral parts and the base part, the coupling device extending through a boundary of the clean room.

3. An apparatus according to claim 1, wherein the sealing device has a resilient sealing means.

4. An apparatus according to claim 1, wherein said at least one drive device includes a first drive device and a second drive device arranged outside the clean room.

5. An apparatus according to claim 1, wherein said at least one drive device is actuated electrically or magnetically.

6. An apparatus according to claim 1, wherein the sealing device comprises at least one of a folding bellows and a gas barrier.

7. An apparatus according to claim 1, further comprising:
supply devices for supplying a tempering liquid for the blow moulds, and
connections for the supply devices arranged inside the sterile room.

8. An apparatus according to claim 1, furthering comprising:
a stressing device which acts upon the plastics material pre-forms with a gaseous medium, the stressing device being arranged inside the sterile room; and
a drive device for moving the stressing device.

9. An apparatus according to claim 8, wherein the drive device is provided outside the clean room.

10. An apparatus according to claim 1, further comprising a stretch rod at each blowing station for stretching the plastics material pre-forms, the stretch rod projecting at least for a time and locally out of the clean room.

11. A plant for producing plastics material containers, comprising:
an apparatus according to claim 1; and
a heating device, the heating device being arranged on a conveying device of the plastics material pre-forms upstream with respect to the apparatus.

12. A plant according to claim 11, further comprising a sterilization device which sterilizes at least one region of the plastics material pre-forms before they reach the apparatus.

13. A plant according to claim 11, further comprising an additional clean room which is arranged upstream of the apparatus in the conveying direction of the plastics material pre-forms.

14. An apparatus according to claim 2, wherein at least one part of the sealing means follows the coupling device with respect to its movement.

15. An apparatus according to claim 1, wherein the sealing device includes a water sealing device with a movable element guided in a water tank.

16. An apparatus according to claim 1, wherein the apparatus has a sterilizing device which sterilizes the individual plastics material performs.

17. An apparatus according to claim 1, wherein a cam is provided for carrying out a reciprocating movement of a base part of the blow mould wherein this cam is arranged outside the sterile room.

18. An apparatus according to claim 1, wherein the sterile room is bounded at the bottom by a perforated and/or solid boundary.

19. An apparatus according to claim 8, wherein the stressing device comprises a blowing nozzle and wherein a drive device for moving the stressing device is provided outside the sterile room.

20. An apparatus according to claim 1, wherein the clean room as at least locally an annular profile or a toroidal profile.

21. An apparatus according to claim 1, wherein the clean room is bounded by a plurality of walls, wherein at least one of these walls is arranged so as to be movable with respect to a further wall.

* * * * *